(12) United States Patent
Jung et al.

(10) Patent No.: US 9,363,824 B2
(45) Date of Patent: Jun. 7, 2016

(54) NETWORK COMMUNICATION METHOD AND TERMINAL IN A HETEROGENEOUS NETWORK ENVIRONMENT

(75) Inventors: Manyoung Jung, Anyang-Si (KR); Suhwan Lim, Anyang-Si (KR); Yoonoh Yang, Anyang-Si (KR); Sangwook Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 14/123,498

(22) PCT Filed: Feb. 8, 2012

(86) PCT No.: PCT/KR2012/000901
§ 371 (c)(1),
(2), (4) Date: Dec. 2, 2013

(87) PCT Pub. No.: WO2012/165750
PCT Pub. Date: Dec. 6, 2012

(65) Prior Publication Data
US 2014/0126504 A1    May 8, 2014

Related U.S. Application Data

(60) Provisional application No. 61/492,818, filed on Jun. 3, 2011.

(51) Int. Cl.
*H04W 72/12* (2009.01)
*H04L 5/00* (2006.01)
(Continued)

(52) U.S. Cl.
CPC ......... *H04W 72/1215* (2013.01); *H04L 5/0037* (2013.01); *H04W 74/0816* (2013.01); *H04W 16/14* (2013.01)

(58) Field of Classification Search
None
See application file for complete search history.

(56) References Cited

U.S. PATENT DOCUMENTS

| 8,923,862 | B2 * | 12/2014 | Jang | ...... H04W 24/10 370/328 |
| 2005/0002355 | A1 * | 1/2005 | Takano | ......... 370/329 |

(Continued)

FOREIGN PATENT DOCUMENTS

| KR | 10-0728356 B1 | 6/2007 |
| KR | 10-2007-0083321 A | 8/2007 |
| KR | 10-2010-0114426 A | 10/2010 |

*Primary Examiner* — Min Jung
(74) *Attorney, Agent, or Firm* — Birch, Stewart, Kolasch & Birch, LLP

(57) ABSTRACT

The present invention relates to a communication method in a heterogeneous network environment using the same frequency band. The method includes: transmitting by a transmitting station a message for using an arbitrary channel in the frequency band to a base station or a heterogeneous terminal using a heterogeneous communication technique; and performing by the transmitting station a data communication with a receiving station through the arbitrary channel. The message includes a time in which the transmitting station uses the arbitrary channel for the data communication. The message is a message with which the heterogeneous base station or the heterogeneous terminal, which receives the message, stops the data communication using the arbitrary channel for the time. Additionally, in this specification, a mobile communication terminal in a heterogeneous network environment using the same frequency band includes: a wireless communication unit for transmitting/receiving a wireless signal to/from outside; and a processor for controlling the wireless communication unit to transmit a message for using an arbitrary channel in the frequency band to a base station or a heterogeneous terminal, which uses a heterogeneous communication technique. The message includes a time that the terminal uses the arbitrary channel for the data communication. The message is a message with which the heterogeneous base station or the heterogeneous terminal, which receives the message, stops the data communication using the arbitrary channel for the time.

11 Claims, 12 Drawing Sheets

(51) Int. Cl.
*H04W 74/08* (2009.01)
*H04W 16/14* (2009.01)

(56) References Cited

U.S. PATENT DOCUMENTS

2005/0025174 A1* 2/2005 Fischer et al. ................ 370/445
2008/0130603 A1* 6/2008 Wentink et al. ............... 370/338
2010/0226343 A1* 9/2010 Hsu et al. ...................... 370/336
2012/0294344 A1* 11/2012 Turtinen et al. ............... 375/224
2013/0272260 A1* 10/2013 Bitran et al. .................. 370/329
2015/0016393 A1* 1/2015 Xhafa ................... H04W 16/14
370/329

* cited by examiner

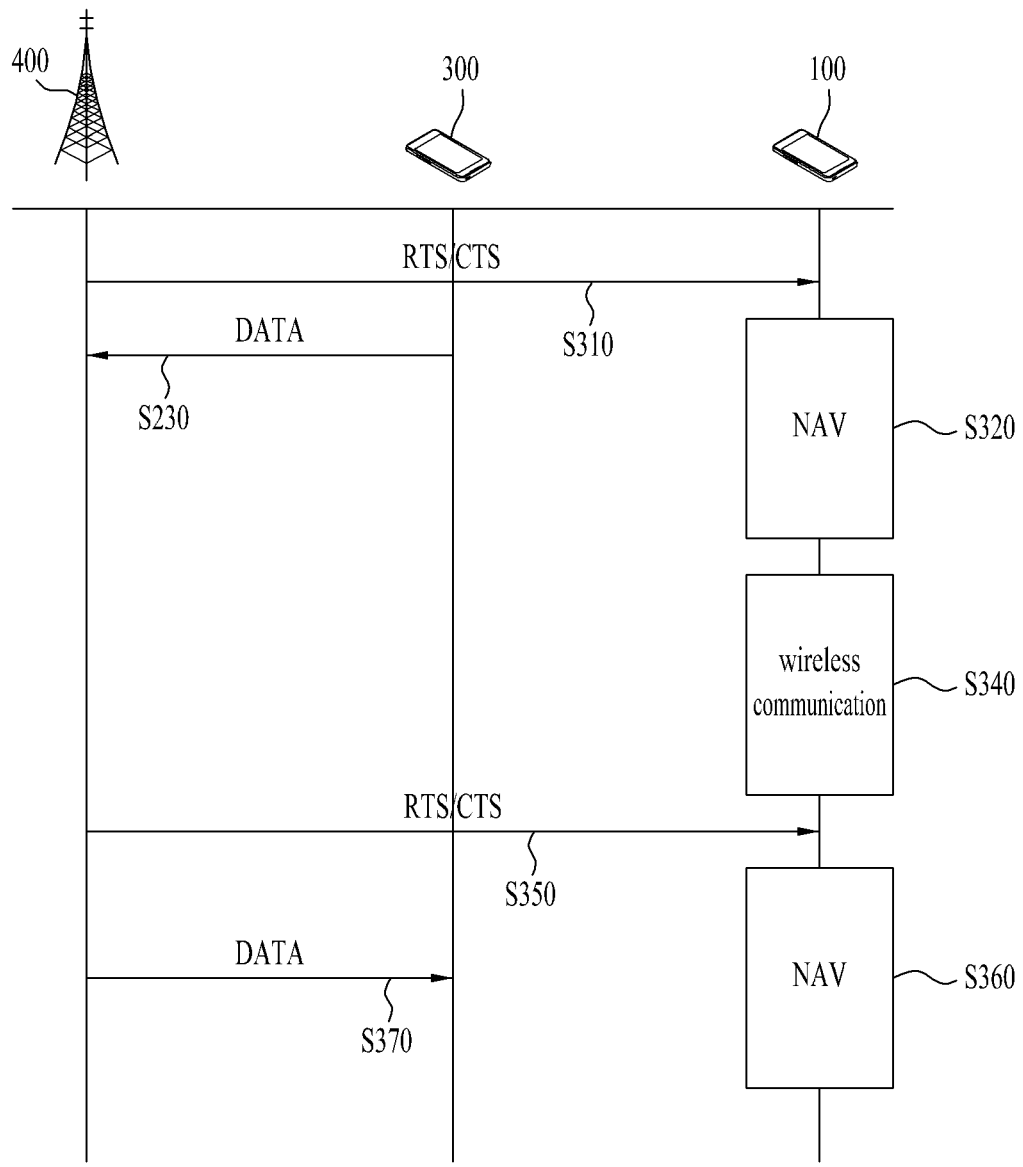

NETWORK COMMUNICATION METHOD AND TERMINAL IN A HETEROGENEOUS NETWORK ENVIRONMENT

CROSS REFERENCE TO RELATED APPLICATIONS

This application is the National Phase of PCT/KR2012/000901 filed on Feb. 8, 2012, which claims priority under 35 U.S.C. 119(e) to U.S. Provisional Application No. 61/492,818 filed on Jun. 3, 2011, all which are hereby incorporated by reference into the present application.

TECHNICAL FIELD

The present invention relates to a network communication method and a terminal in a heterogeneous network environment.

BACKGROUND ART

Due to the recent drastic growth of data communication, there exists an ever-increasing demand for using unlicensed spectrum such as TV White Space (TVWS) in order to overcome the shortage of frequency bands. In this context, many attempts have been taken to deploy a high-speed wireless data communication system such as Wireless Local Area Network (WLAN) in the TVWS frequency band.

However, it is not easy to introduce unlicensed spectrum to a cellular wireless data transmission system such as Long Term Evolution (LTE) in which a Base Station (BS) should perform a transmission and reception procedure at a predetermined time point, because exclusive occupation of a frequency channel is impossible in view of the nature of the unlicensed spectrum that tolerates interference.

Considering that various devices can use an unlicensed frequency band without being licensed to supplement lacking frequency resources, an LTE system may coexist with a WLAN system in the unlicensed frequency band. To allow the LTE system to exclusively occupy a frequency, for a normal operation, it is necessary to give considerations to co-existence between heterogeneous devices.

Especially, a technique for enabling co-existence in TVWS between a device conforming to Institute of Electrical and Electronics Engineers (IEEE) 802 which is currently widely deployed for wireless communication and a NON-802 device is under study.

WLAN in TVWS is under standardization in IEEE 802.11, and a co-existence scenario is being developed in IEEE 802.19.

DISCLOSURE

Technical Problem

An object of the present invention devised to solve the conventional problem is to provide a network communication method and a terminal for enabling a Long Term Evolution (LTE) terminal and an LTE base station to occupy a frequency channel exclusively for an intended time period by means of a virtual Wireless Local Area Network (WLAN) control signal and to conduct data communication in a heterogeneous network environment in which an LTE system and a WLAN system co-exist.

Technical Solution

In an aspect of the present invention, a communication method in a heterogeneous network environment using the same frequency band includes transmitting a message for using an arbitrary channel in the frequency band to a base station using a heterogeneous communication scheme or a heterogeneous terminal by a transmitter, and conducting data communication with a receiver on the arbitrary channel. The message includes information about a time during which the transmitter will use the arbitrary channel for the data communication, and upon receipt of the message, the heterogeneous base station or the heterogeneous terminal discontinues data communication on the arbitrary channel for the time indicated by the message.

The transmitter may be a mobile communication base station or a mobile communication terminal.

The heterogeneous base station and the heterogeneous terminal may use an 802.11 system.

The message may be a Request to Send (RTS) message and a Clear to Send (CTS) message used in the 802.11 system and the time may be indicated by a Network Allocation Vector (NAV).

Upon receipt of the message from the transmitter, the receiver may not decode the message.

The channel may be a channel of Television White Space (TVWS).

Resources may be allocated based on scheduling between the transmitter and the receiver and resources may be allocated based on contention between the heterogeneous base station and the heterogeneous terminal.

In an aspect of the present invention, a mobile communication terminal in a heterogeneous network environment using the same frequency band includes a wireless communication unit configured to transmit transmitting a signal to and receive a signal from outside, and a processor configured to transmit a message for using an arbitrary channel in the frequency band to a base station using a heterogeneous communication scheme or a heterogeneous terminal by controlling the wireless communication unit and to conduct data communication with a mobile communication base station on the arbitrary channel. The message includes information about a time during which the mobile communication terminal will use the arbitrary channel for the data communication, and upon receipt of the message, the heterogeneous base station or the heterogeneous terminal discontinues data communication on the arbitrary channel for the time indicated by the message.

The heterogeneous base station and the heterogeneous terminal may use an 802.11 system.

The message may be a Request to Send (RTS) message and a Clear to Send (CTS) message used in the 802.11 system and the time may be indicated by a Network Allocation Vector (NAV).

If the processor receives the message from the mobile communication base station, the processor may not decode the message.

The channel may be a channel of Television White Space (TVWS).

Resources may be allocated based on scheduling between the transmitter and the receiver and resources may be allocated based on contention between the heterogeneous base station and the heterogeneous terminal.

Advantageous Effects

According to the network communication method and terminal in a heterogeneous network environment disclosed in the present invention, an LTE terminal can occupy a frequency channel exclusively at an intended time by means of a virtual WLAN control signal. Therefore, when a cellular system such as an LTE system coexists with a WLAN system, the cellular system can operate normally.

Furthermore, according to the network communication method and terminal in a heterogeneous network environment disclosed in the present invention, since control interference between heterogeneous systems in an unlicensed frequency band can be canceled, the present invention can be used in discussing wireless standards (IEEE 802.11 and IEEE 802.19) of co-existence between wireless devices in an unlicensed frequency band.

BRIEF DESCRIPTION OF THE DRAWINGS

FIG. 18 is a diagram illustrating a signal flow for a network communication method using an RTS message and a CTS message in a heterogeneous network environment according to another embodiment of the present invention.

BEST MODE FOR CARRYING OUT THE INVENTION

The embodiments of the present invention can be used for various radio access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General packet Radio Service/Enhanced Data Rates for GSM Evolution (GSM/GPRS/EDGE). OFDMA may be implemented as a radio technology such as Institute of Electrical and Electronics Engineers (IEEE) 802.11 (Wi-Fi), Evolved UTRA (E-UTRA), etc.

UTRA is a part of Universal Mobile Telecommunications System (UMTS). 3$^{rd}$ Generation Partnership Project Long Term Evolution (3GPP LTE) is a part of Evolved UMTS (E-UMTS) using E-UTRA and LTE-Advanced (LTE-A) is an evolution of 3GPP LTE.

Technical terms used in the present disclosure are used just to describe specific embodiments of the present invention and it is to be clearly understood that the terms are not intended to limit the present invention. Unless otherwise defined, the technical terms should be interpreted as general meanings understood by those skilled in the art. They should not be interpreted as an excessively comprehensive meaning or an excessively narrow meaning. In addition, if a technical term used herein is a wrong one that does not accurately describe the technical spirit of the present invention, it should be understood as replaced with an appropriate technical term understandable to those skilled in the art.

Unless otherwise meant, a singular expression includes a plural expression. In the disclosure, "include" or "comprise" should not be interpreted as necessarily including a plurality of components or steps described in the disclosure. Rather, the term should be interpreted as meaning that some component or step may be excluded or may be added.

The term "unit" is attached to the name of a component in the disclosure, just for the convenience of description. "Unit" itself does not have a distinguishing meaning or role.

A detailed description of known procedures or steps of the present invention will be avoided lest it should obscure the subject matter of the present invention. The attached drawings are provided to help the understanding of the technical spirit of the present invention, and should not be interpreted as limiting the technical spirit of the present invention.

Hereinbelow, embodiments of the present invention will be described in detail with reference to the attached drawings.

Figure 1:
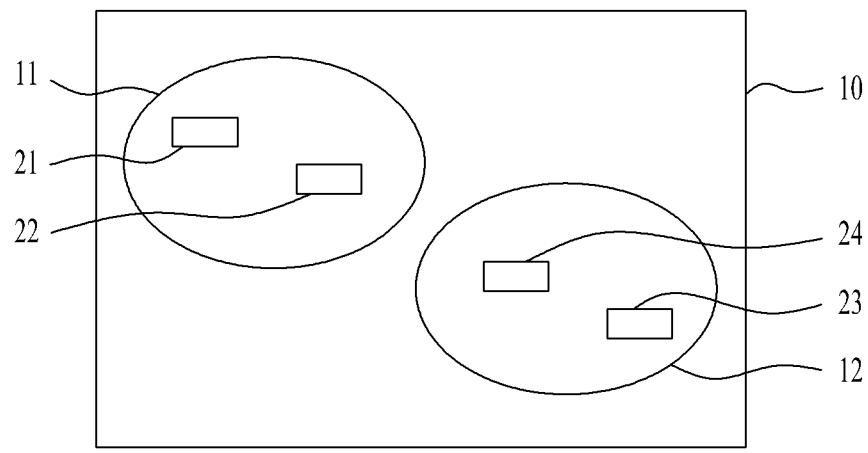
FIG. 1 illustrates a Wireless Local Area Network (WLAN) system.

FIG. 1 illustrates the configuration of a Wireless Local Area Network (WLAN) system.

Referring to FIG. 1, a WLAN system 10 conforming to the IEEE 802.11 standard includes one or more Basic Service Sets (BSSs) 11 and 12 and one or more Stations (STAs) 21 to 24.

The BSS 11 includes the STAs 21 and 22 as members and the BSS 12 includes the STAs 23 and 24 as members. Ovals drawn in FIG. 1 represent the service coverages of the BSSs 11 and 12 within which the STAs 21 to 24 may communicate. The service coverages are called Basic Service Areas (BSAs). When the STAs 21 to 24 move out of the BSAs, they may communicate with other STAs in the BSAs no longer.

An Independent BSS (IBSS) is the most basic type of IEEE 802.11 WLAN. A minimum WLAN includes only two STAs. Since each of the BSSs 11 and 12 is very simple and does not include any other component, it is a major example of IBSS. An IBSS operation mode is possible when the STAs 21 to 24 can communicate directly peer-to-peer in the WLAN system. Since an IBSS-type WLAN is often formed without pre-planning for as long as the WLAN is needed, an IBSS is also referred to as an ad hoc network.

As the STAs 21 to 24 are turned on, are turned off, move into, or move out of the BSSs 11 and 12, the membership of the STAs 21 to 24 in the BSSs 11 and 12 is dynamic. To be members of the BSSs 11 and 12, the STAs 21 to 24 may join the BSSs 11 and 12 using a synchronization procedure. To access all BSS-based services, the STAs 21 to 24 should become "associated" with the BSSs 11 and 12. These associations are dynamic and involve the use of a Distribution System Service (DSS).

Figure 2:
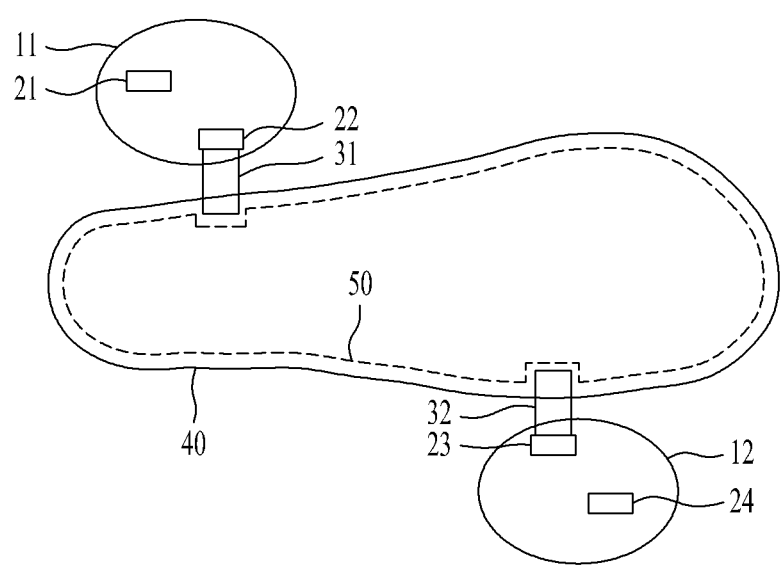
FIG. 2 illustrates an exemplary extended WLAN system.

FIG. 2 illustrates an exemplary extended WLAN system.

Referring to FIG. 2, a WLAN system may include extended components which are networks including the plurality of BSSs 11 and 12. The plurality of BSSs 11 and 12 are interconnected by a Distribution System (DS) 40.

IEEE 802.11 logically separates a Wireless Medium (WM) from a Distribution System Medium (DSM) 50. The WLAN system neither requires nor excludes that a plurality of media are identical or different.

The DS 40 enables mobile terminal support by logical services needed to handle address to destination mapping and seamless integration of the plurality of BSSs 11 and 12.

Access Points (APs) 31 and 32 have STA functionality and access the DS 40 through a WM of the STAs 22 and 24 which have been associated with the APs 31 and 32.

Data move between the BSSs 11 and 12 and the DS 40 through the APs 31 and 32. Since the APs 31 and 32 can be associated with the STAs 22 and 24, the APs 31 and 32 also act as STAs. Accordingly, the APs 31 and 32 are addressable entities. Addresses used by the APs 31 and 32 for communication in the WM and the DSM 50 are not necessarily same.

Data sent to the addresses of the STAs 22 and 24 associated with the Aps 31 and 32 is always received at uncontrolled ports for processing by IEEE 802.1X port access entities.

An Extended Service Set (ESS) for a wide service area network will be described below.

Figure 3:
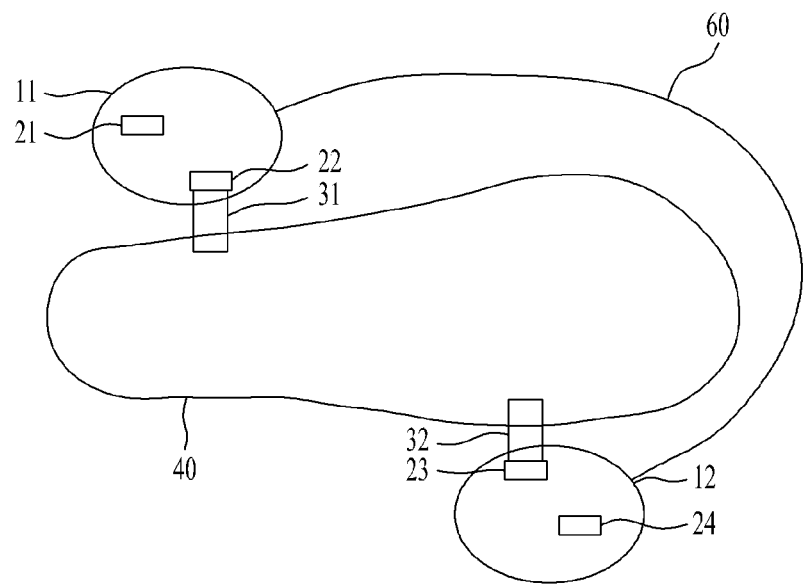
FIG. 3 illustrates another exemplary WLAN system that forms an Extended Service Set (ESS)

FIG. 3 illustrates another exemplary WLAN system that forms an ESS.

Referring to FIG. 3, the DS 40 and the BSSs 11 and 12 form an IEEE 802.11 wireless network of an arbitrary size and arbitrary complexity. The network illustrated in FIG. 3 is called an ESS network in the IEEE 802.11 standard. An ESS 50 is a union of the BSSs 11 and 12 connected through the DS 40. Accordingly, the DS 40 is not a part of the ESS 50. The ESS 50 appears the same to a Logical Link Control (LLC) layer as an IBSS network. The STAs 21 to 24 may communicate directly with one another in the ESS 50. If the STAs 21 to 24 are mobile, they may move from one BBS to another BBS (in the same ESS 50), transparently to the LLC layer.

Nothing is assumed by IEEE 802.11 about the relative physical locations of the BSSs 11 and 12 illustrated in FIG. 3. All of the followings are possible.

A) The BSSs 11 and 12 may partially overlap with each other. This is commonly used to arrange contiguous coverage within a physical space.

B) The BSs 11 and 12 may be physically disjointed. Logically there is no limit to the distance between the BSSs 11 and 12.

C) The BSSs 11 and 12 may be physically collocated. This may be done to provide redundancy.

D) One (or more) IBSS or ESS networks may be physically present in the same space as one (or more) ESS networks. This may arise for a number of reasons, for example, when an ad hoc network is operating in a location that also has an ESS network, when physically overlapping IEEE 802.11 networks have been set up by different organizations, and Physically overlapping IEEE 802.11 networks set up by different organizations, and when two or more different access and security policies are needed in the same location.

Figure 4:
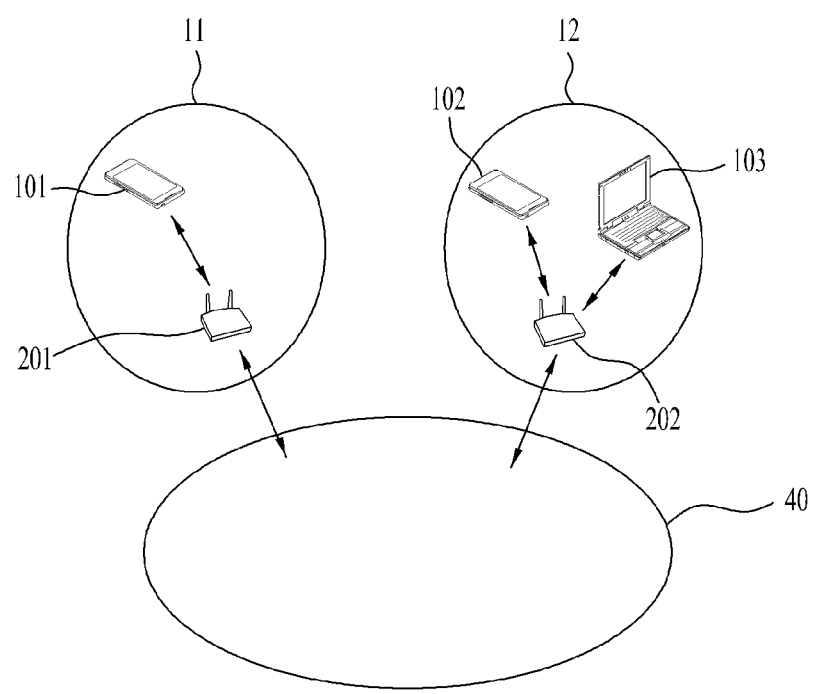
FIG. 4 illustrates a typical WLAN system.

FIG. 4 illustrates a typical configuration of a WLAN system.

Referring to FIG. 4, an ESS 60 includes the BSSs 11 and 12 (BSS 1 and BSS 2). The BSS 11 includes an STA 101 and an AP 201, and the BSS 12 includes STAs 102 and 103 and an AP 202.

The STAs 101, 102, and 103 may be various electronic devices such as mobile terminals, telematics terminals, smart phones, portable terminals, Personal Digital Assistants (PDAs), Portable Multimedia Players (PMPs), laptop computers, tablet Personal Computers (PCs), Wireless broadband (Wibro) devices, Internet Protocol Televisions (IPTVs), TVs, three-dimensional (3D) TVs, video players, navigators, Audio Video Navigation (AVN) devices, etc.

The STAs 101, 102, and 103 may be referred to as terminals, Wireless Transmit/Receive Units (WTRUs), User Equipments (UEs), Mobile Stations (MSs), mobile terminals, mobile subscriber units, etc.

The APs 201 and 202 may be referred to as Base Stations (BSs), Node Bs, evolved Node Bs (eNBs or eNode Bs), Basic Transceiver Systems (BTSs), or femto BSs.

Figure 5:
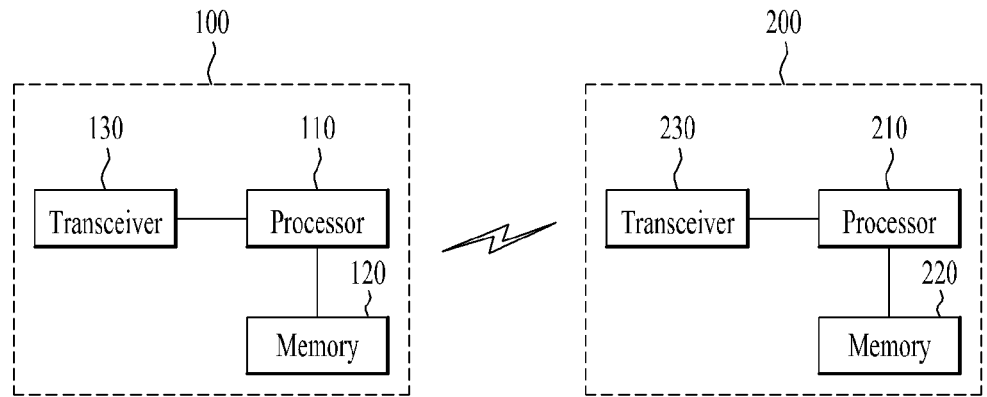
FIG. 5 is a block diagram of a WLAN Access Point (AP) and a WLAN Station (STA) according to an embodiment of the present invention.

FIG. 5 is a block diagram of a WLAN AP and a WLAN STA according to an embodiment of the present invention.

Referring to FIG. 5, an STA 100 may include a processor 110, a memory 120, and a transceiver 130. An AP 200 may include a processor 210, a memory 220, and a transceiver 230.

The transceivers 130 and 230 transmit/receive radio signals and implement IEEE 802 physical layers. The processors 110 and 210 are connected to the transceivers 130 and 230 to implement the IEEE 802 physical layers and/or Medium Access Control (MAC) layers. The processors 110 and 210 may perform a channel scan scheme.

The processors 110 and 210 and/or the transceivers 130 and 230 may include Application Specific Integrated Circuits (ASICs) or other chip sets, logical circuits, and/or data processors. Each of the memories 120 and 220 may include a Read Only Memory (ROM), a Random Access Memory (RAM), a flash memory, a memory card, a storage medium, and/or other storage devices. When the embodiments of the present invention are implemented in software, the above-described method may be realized by a module (a process, a function, etc.) that performs the above-described function. The module may be stored in the memories 120 and 220 and executed by the processors 110 and 210. The memories 120 and 220 may reside inside or outside the processors 110 and 210 and may be connected to the processors 110 and 210 by known means.

Among the afore-described components, the processors 110 and 210 will be described in more detail.

Figure 6:
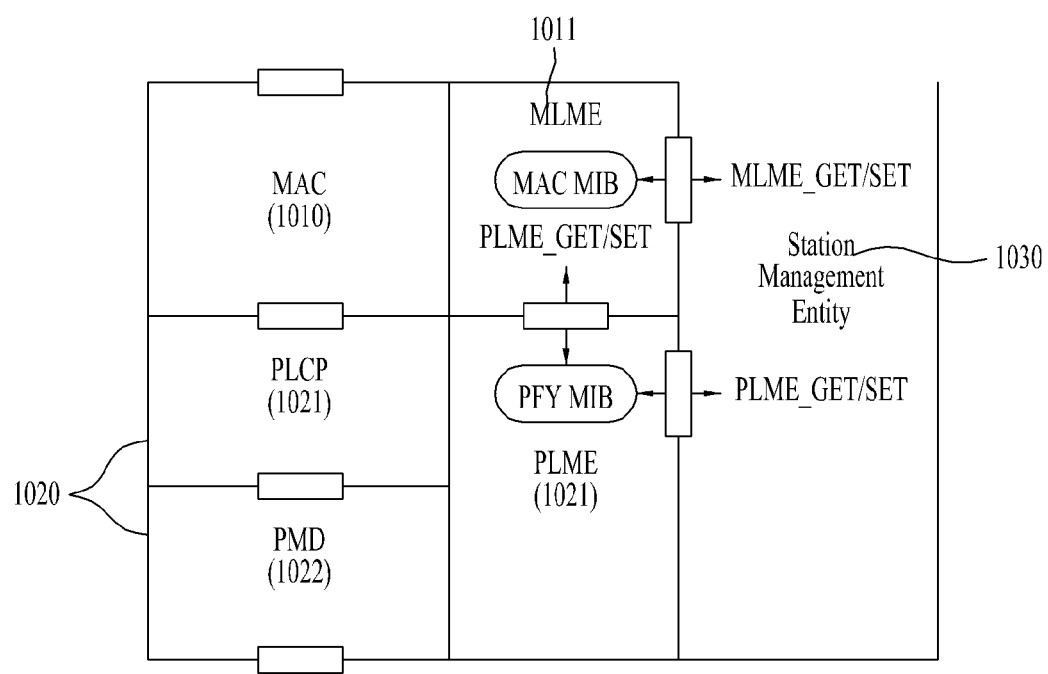
FIG. 6 is a block diagram of processors of a WLAN AP and a WLAN STA according to an embodiment of the present invention.

FIG. 6 is a block diagram of processors of a WLAN AP and a WLAN STA according to an embodiment of the present invention.

Referring to FIG. 6, each of the processors 110 and 210 may have multiple layers. Particularly, FIG. 6 focuses on a MAC sublayer 1010 of a Data Link Layer (DLL) and a Physical layer (PHY) 1020 among these layers. As illustrated in FIG. 6, the PHY 1020 may include a Physical Layer Convergence Procedure (PLCP) entity 1021 and a Physical Medium Dependent (PMD) entity 1022. The MAC sublayer 1010 and the PHY 1020 may conceptually include a MAC Sublayer Management Entity (MLME) 1011 and a Physical Layer Management Entity (PLME) 1021, respectively. The MLME 1011 and the PLME 1021 provide a layer management service interface through a layer that can invoke a management function.

In order to provide a correct MAC operation, a Station Management Entity (SME) 1030 is present within each STA. The SME 1030 is a layer independent entity that can be viewed as residing in a separate management plane or as residing "off to the side." The exact functions of the SME are not specified in this disclosure, but in general this entity can be viewed as being responsible for such functions as gathering of layer-dependent status information from various Layer Management Entities (LMEs), and similarly setting values of layer-specific parameters. The SME 1030 typically performs such functions on behalf of general system management entities and implements standard management protocols.

The entities illustrated in FIG. 6 interact with one another in various manners. FIG. 6 illustrates a few examples of GET/SET primitive exchange. An XX-GET.request primitive is used to request the value of a given MIBattribute (management information base attribute). If Status="Success", an XX-GET.confirm primitive returns an appropriate MIBattribute value and otherwise, it is used to return an error indication in a Status field. An XX-SET.request primitive is used for requesting that the indicated MIB attribute be set to a given value. If this MIB attribute implies a specific action, then this requests that the action be performed. If Status="Success", the XX-SET.confirm primitive confirms that the indicated MIB attribute was set to the requested value. Otherwise, the XX-SET.confirm primitive returns an error condition in the Status field. If this MIB attribute implies a specific action, then this confirms that the action was performed.

Figure 7:
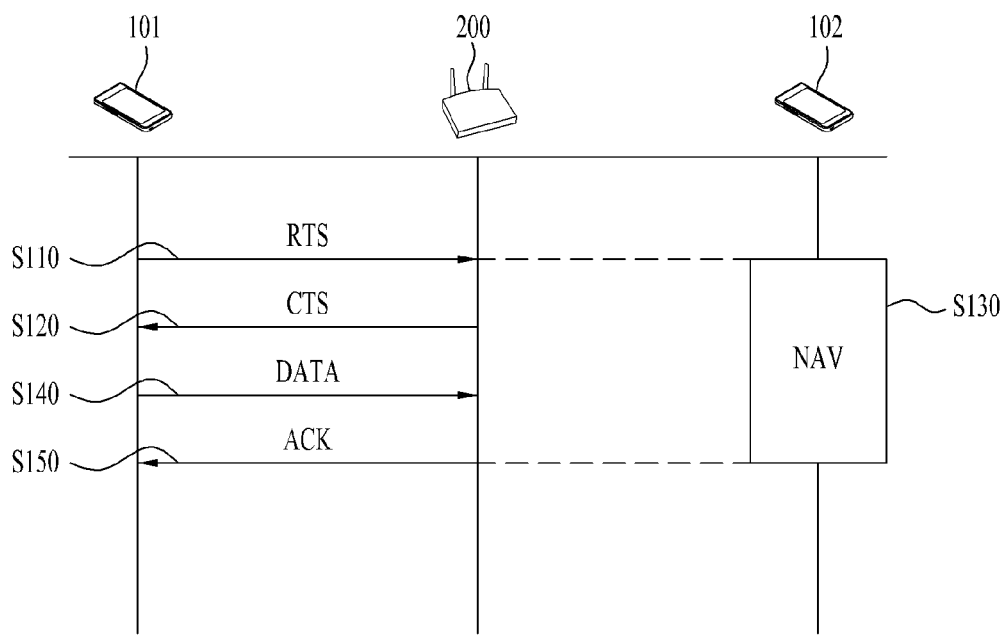
FIG. 7 is a diagram illustrating a signal flow for a network communication method using a Request to Send (RTS) message and a Clear to Send (CTS) message in a WLAN system.

FIG. 7 is a diagram illustrating a signal flow for a network communication method using a Request to Send (RTS) message and a Clear to Send (CTS) message in a WLAN system.

Referring to FIG. 7, STAs 101 and 102 and an AP 200 may conduct data communication by a contention-based resource allocation scheme called Carrier Sense Multiple Access with Collision Avoidance (CSMA/CA) in the WLAN system. CSMA/CA is a general MAC algorithm used for wireless communication and based on the following operation principle.

First, the STA 101 transmits an RTS message to the AP 200 (S110).

The STA 101 may transmit the RTS message to the AP 200 to check whether the STA 101 can conduct data communication on a requested channel.

The STA 101 may transmit the RTS message to the AP 200 a specific interframe space after an arbitrary time point. The interframe space may be a DCF Interframe Space (DIFS).

The arbitrary channel may be a channel in an arbitrary frequency band of the TVWS band.

Figure 8:
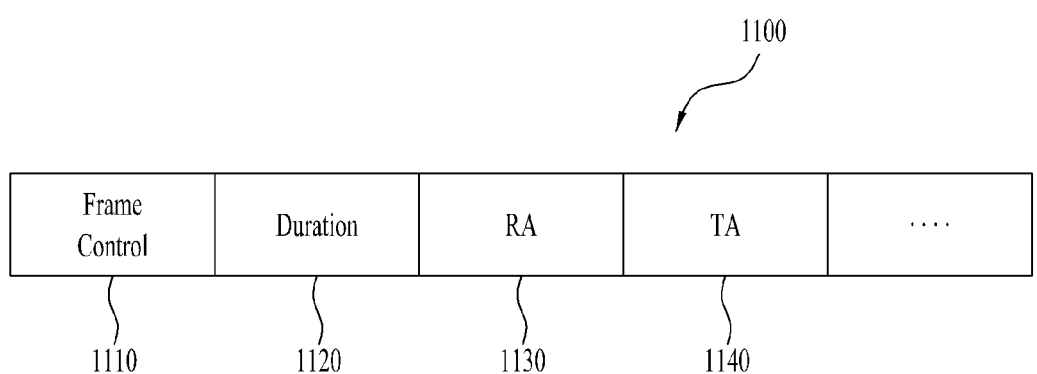
FIG. 8 illustrates the structure of an RTS message in a WLAN system.

Referring to FIG. 8, an RTS message 1100 may include a Frame Control field 1110, a Duration field 1120, a Receiver Address (RA) field 1130, and a Transmitter Address (TA) field 1140.

The Frame Control field 1110 may include Protocol Version indicating the frame version of the RTS message 1100, Frame Type indicating the frame type of the RTS message 1100 (CONTROL, DATA, or MANAGEMENT), and Sub Type indicating members information of the RTS message. The Frame Control field 1110 may include To DS and From DS to indicate a communication direction.

The Frame Control field 1110 may include More Fragments indicating whether there is an additional fragmented packet, Retry used to request in the case where an ACKNowledgement (ACK) has not been received from the AP 200, Power Management, and More Data indicating whether there is more following data. The Frame Control field 1110 may include Wired Equivalency Privacy (WEP) indicating whether a frame body has been encrypted or not and Order indicating whether a strictly-ordered service class is used or not.

The Frame Control field 1110 may be 2 bytes long.

The Duration field 1120 may indicate a time in microseconds required for the STA 101 to transmit data to the AP 200.

The time may a duration for which the STA 101 will use the arbitrary channel, that is, from transmission of the RTS message 1100 from the STA 101 to the AP 200 to reception of an ACK signal from the AP 200.

The time may be represented as a Network Allocation Vector (NAV) value.

The Duration field 1120 may include an Association Identifier (AID) of the STA 101.

The Duration field 1120 may have a 2-byte size.

The RA field 1130 may include a MAC address that identifies a wireless device to receive the RTS message 1100. The MAC address may be the address of the AP 200. The RA field 1130 may be 8 bytes long.

The TA field 1140 may include a MAC address that identifies a wireless device transmitting the RTS message 1100. The MAC address may be the address of the STA 101. The TA field 1140 may have 8 bytes.

In addition, the RTS message 1100 may include a Cyclic Redundancy Check (CRC) field to detect a data error in the frame of the RTS message 1100.

Subsequently, the STA 101 receives a CTS message from the AP 200 (S120).

The STA 101 may receive the CTS message indicating that data communication on the arbitrary channel is possible from the AP 200.

The STA 101 may receive the CTS message from the AP 200 a predetermined interframe space after the AP 200 receives the RTS message. The interframe space may be an SIFS.

Figure 9:
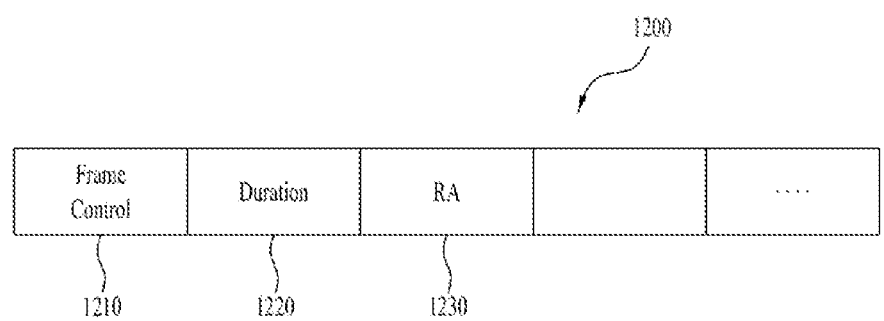
FIG. 9 illustrates the structure of a CTS message in a WLAN system.

Referring to FIG. 9, a CTS message 1200 may include a Frame Control field 1210, a Duration field 1220, and an RA field 1230.

The Duration field 1220 indicates a time requested in the RTS message 1100 by the STA 101, during which the arbitrary channel will be used. That is, the Duration field 1220 may have a NAV value calculated by subtracting a time taken for the AP 200 to receive the RTS message 1100 from the NAV value set in the RTS message 1100.

The RA field 1230 indicates a MAC address that identifies a wireless device to receive the CTS message 1200. The MAC address may be that of the STA 101.

The CTS message may further include a CRC field to detect a data error in the frame of the CTS message 1200.

A description of other fields in the CTS message 1200 is pursuant to the description of their counterparts in the RTS message 1100.

The AP 200 may transmit the CTS message to the STA 102 as well as the STA 101 within the service coverage of the AP 200.

Upon receipt of the CTS message, the STA 102 discontinues communication for a time period indicated by the NAV value included in the CTS message 1200 (S130).

The STA 102 may discontinue the communication by setting the data communication on the arbitrary channel to a standby mode.

The STA 102 may estimate a time period for which the STA 102 should discontinue using the arbitrary channel based on the NAV value. Consequently, the STAs 101 and 102 may transmit and receive data on the same arbitrary channel without collision based on the NAV value.

Then the STA 101 transmits data to the AP 200 (S140).

The STA 101 may transmit intended data to the AP 200 or to the STA 102 through the AP 200.

The STA 101 may transmit the data to the AP 200 a predetermined interframe space after completely receiving the CTS message from the AP 200. The predetermined interframe space may be an SIFS.

The STA 101 receives an ACK signal from the AP 200 (S150).

After the data transmission, the STA 101 may receive an ACK signal indicating successful reception of the data from the AP 200. The STA 101 may receive the ACK signal from the AP 200 a predetermined interframe space after completely transmitting the data to the AP 200. The predetermined interframe space may be an SIFS.

On the other hand, if the STA 101 has not received an ACK signal from the AP 200, the STA 101 may retransmit the data to the AP 200, determining that the data has been lost during transmission.

Now a description will be given of an LTE system to which the present invention is applicable.

Figure 10:
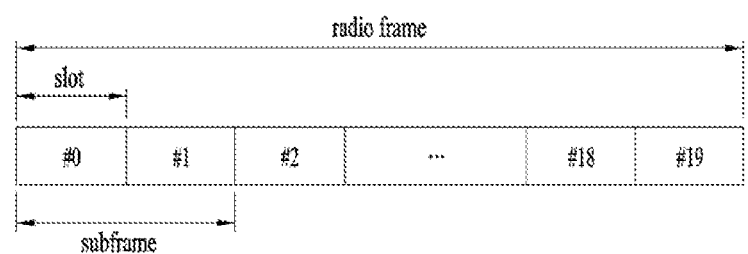
FIG. 10 illustrates the structure of a radio frame in a 3$^{rd}$ Generation Partnership Project Long Term Evolution (3GPP LTE) system.

FIG. 10 illustrates the structure of a radio frame in a 3GPP LTE system.

Referring to FIG. 10, one radio frame is 10 ms (307200·$T_s$) long, including 10 equal-sized subframes. Each subframe is 1 ms long, including two slots. Each slot is 0.5 ms (15360·$T_s$) long. $T_s$ is a sampling time given as $T_s=1/(15\text{ kHz}\times2048)=3.1552\times10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

In the LTE system, one RB includes 12 subcarriers by 7 (or 6) OFDM symbols or SC-FDMA symbols. A unit time during which data is transmitted, Transmission Time Interval (TTI) may be set to be one or more subframes. The above radio frame structure is purely exemplary. Thus, the number of subframes in a radio frame, the number of slots in a subframe, or the number of OFDM symbols or SC-FDMA symbols in a slot may be changed.

Figure 11:
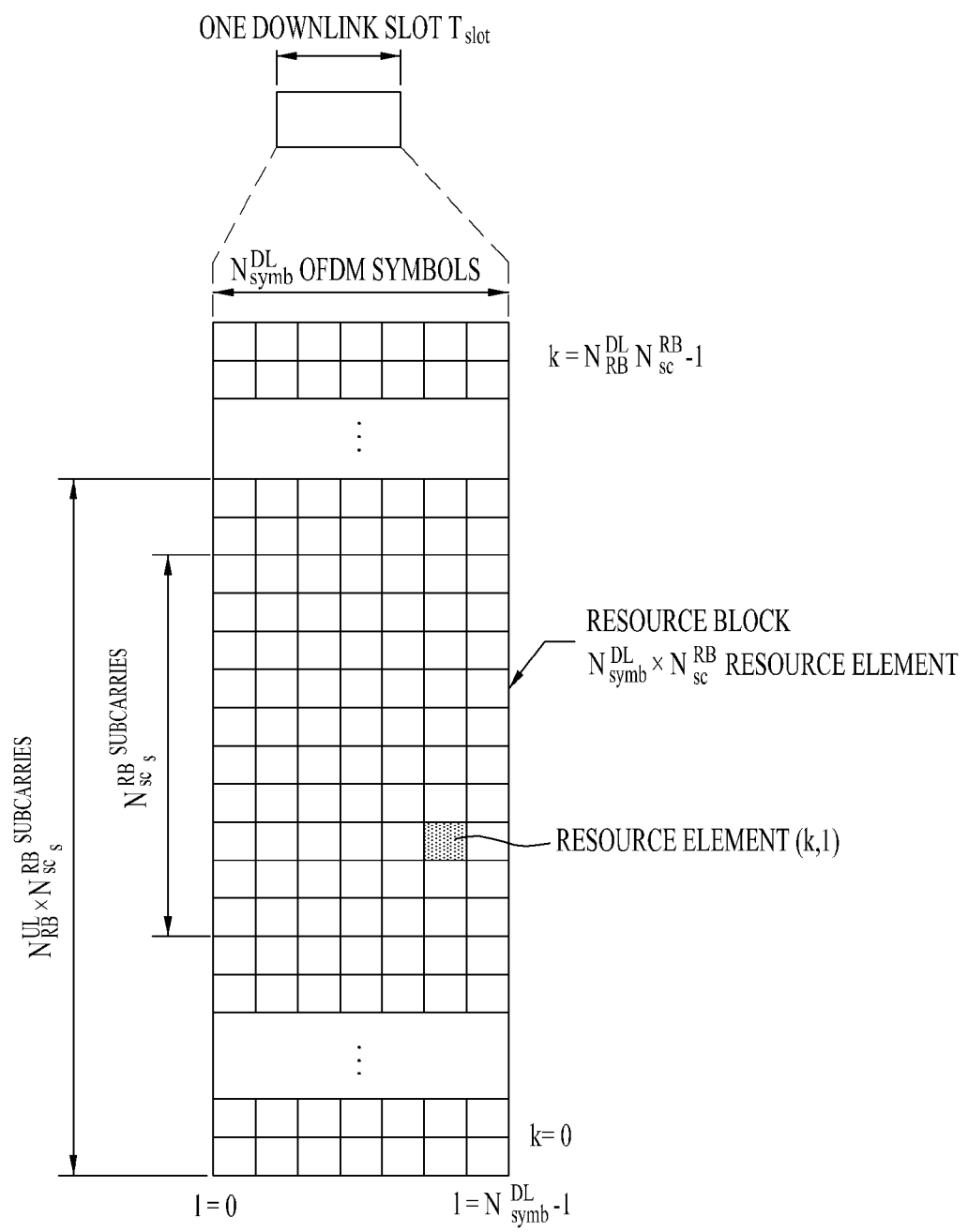
FIG. 11 illustrates the structure of a downlink time-frequency resource grid in a 3GPP LTE system.

FIG. 11 illustrates the structure of a downlink time-frequency resource grid in a 3GPP LTE system.

In each slot, a downlink signal is transmitted using a resource grid including $N_{symb}^{DL}$ OFDM symbols by $N_{symb}^{DL} \times N_{SC}^{RB}$ subcarriers. $N_{RB}^{DL}$ is the number of subcarriers in one RB and $N_{symb}^{DL}$ is the number of ODSM symbols in one downlink slot. The value of $N_{RB}^{DL}$ depends on a downlink transmission bandwidth configured in a cell, satisfying $N_{RB}^{min,DL} \leq N_{RB}^{DL} \leq N_{RB}^{max,DL}$ where $N_{RB}^{min,DL}$ is a minimum downlink bandwidth supported in the wireless communication system and $N_{RB}^{max,RB}$ is a maximum downlink bandwidth supported in the wireless communication system. It may be set that $N_{RB}^{min,DL}=6$ and $N_{RB}^{max,RB}=110$, which should not be construed as limiting the present invention. The number of OFDM symbols in one slot may vary with a Cyclic Prefix (CP) length and a subcarrier spacing. For multi-antenna transmission, one resource grid may be defined per antenna port.

Each element of a resource grid for each antenna port is called a Resource Element (RE) identified by an index pair (k, l) in a slot. Herein, k is a frequency-domain index ranging from 0 to $N_{RB}^{DL} N_{SC}^{RB}-1$ and l is a time-domain index ranging from 0 to $N_{symb}^{DL-1}$.

An RB illustrated in FIG. 11 is used to describe mapping between a physical channel and REs. RBs may be categorized into Physical Resource Block (PRB) and Virtual Resource Block (VRB). One PRB is defined as $N_{symb}^{DL}$ consecutive OFDM symbols in the time domain by $N_{SC}^{RB}$ consecutive subcarriers in the frequency domain. $N_{symb}^{DL}$ and $N_{SC}^{RB}$ may be preset. For example, $N_{symb}^{DL}$ and $N_{SC}^{RB}$ may be given as illustrated in [Table 1] below. Therefore, one PRB includes $N_{symb}^{DL} \times N_{SC}^{RB}$ REs. One PRB may correspond to one slot in the time domain and 180 kHz in the frequency domain, which should not be construed as limiting the present invention.

TABLE 1

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | 24 | 6 |
| | Δf = 7.5 kHz | | 3 |

The index of a PRB ranges from 0 to $N_{RB}^{DL-1}$. The relationship between a PRB index in the frequency domain, $n_{PRB}$ and an RE (k, l) satisfies $$n_{PRB} = \left\lfloor \frac{k}{N_{SC}^{RB}} \right\rfloor.$$

The PRB equals to the VRB in size. There are two types of VRBs, Localized VRB (LVRB) and Distributed VRB (DVRB). For each VRB type, a single VRB index $n_{VRB}$ is assigned to a pair of VRBs in the two slots of one subframe.

The VRB may equal to the PRB in size. There are two types of VRBs, LVRB and DVRB. For each VRB type, a single VRB index $n_{VRB}$ is assigned to a pair of VRBs in the two slots of one subframe. In other words, $N_{RB}^{DL}$ VRBs in the first slot of the two slots of a subframe are indexed from 0 to $N_{RB}^{DL-1}$ and $N_{RB}^{DL}$ VRBs in the second slot of the two slots of the subframe are also indexed from 0 to $N_{RB}^{DL-1}$ in the same manner.

FIG. 12 illustrates the structures of a downlink subframe and an uplink subframe in a 3GPP LTE system.

Figure 12A:
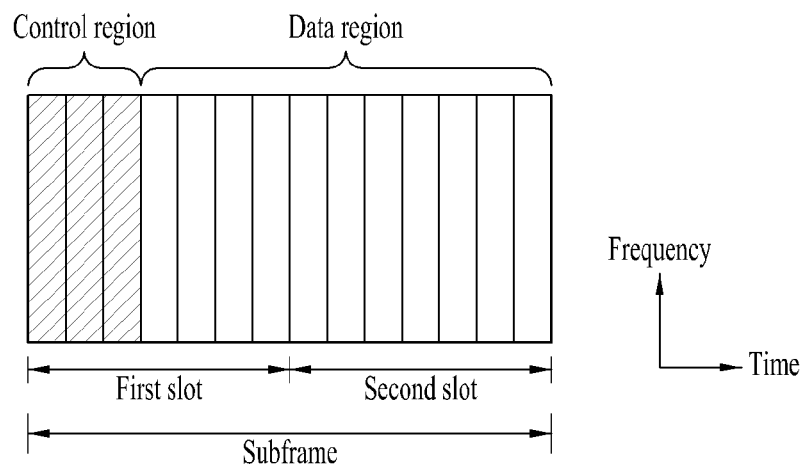
FIG. 12a illustrates the structure of a downlink subframe in a 3GPP LTE system.

Referring to FIG. 12a, one downlink subframe includes two slots in the time domain. Up to 3 OFDM symbols at the start of the first slot in a downlink subframe are used for a control region to which control channels are allocated and the other OFDM symbols of the downlink subframe are used for a data region to which a Physical Downlink Shared Channel (PDSCH) is allocated.

Downlink control channels used in the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols (i.e. the size of the control region) used for transmission of control channels in the subframe. Control information carried on the PDCCH is called Downlink Control Information (DCI). The DCI transports uplink resource allocation information, downlink resource allocation information, uplink transmission power control commands for UE groups, etc. The PHICH delivers an HARQ ACKnowledgment/Negative ACKnowledgment (ACK/NACK) signal as a response to an uplink transmission.

A downlink physical channel, PDCCH will be described below in brief.

An eNB may transmit, on a PDCCH, information about resource allocation and a transport format for a Downlink Shared Channel (DL-SCH) (i.e. a DL grant), information about resource allocation for an Uplink Shared Channel (UL-SCH) (i.e. a UL grant), a set of Tx power control commands for individual UEs of a UE group, Voice Over Internet Protocol (VoIP) activation indication information, etc. A plurality of PDCCHs may be transmitted in the control region. A UE may monitor a plurality of PDCCHs. A PDCCH is transmitted in an aggregate of one or more consecutive Control Channel Elements (CCEs).

A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

Control information transmitted on a PDCCH is called DCI. [Table 2] lists DCI according to DCI formats.

TABLE 2

| DCI format | Description |
| --- | --- |
| DCI format 0 | Used for PUSCH scheduling |
| DCI format 1 | Used for single codeword PDSCH scheduling |
| DCI format 1A | Used for compact scheduling of single PDSCH codeword and random access |
| DCI format 1B | Used for compact scheduling of single PDSCH codeword having precoding information |
| DCI format 1C | Used for very compact scheduling of single PDSCH codeword |
| DCI format 1D | Used for very compact scheduling of single PDSCH codeword having precoding and power offset information |
| DCI format 2 | Used for PDSCH scheduling of UEs in closed-loop spatial multiplexing mode |
| DCI format 2A | Used for PDSCH scheduling of UEs in open-loop spatial multiplexing mode |
| DCI format 3 | Used for transmitting TPC command having 2-bit power adjustment, for PUCCH and PUSCH |
| DCI format 3A | Used for transmitting TPC command having 1-bit power adjustment, for PUCCH and PUSCH |

Referring to [Table 2], DCI format 0 carries uplink resource allocation information, DCI formats 1 to 2 carry downlink resource allocation information, and DCO formats 3 and 3A carry an uplink Transmit Power Control (TPC) command for UE groups.

A method for mapping resources for PDCCH transmission in an eNB in the LTE system will be described briefly.

In general, the eNB may transmit scheduling information and other control information on a PDCCH. The PDCCH is made up of an aggregate of one or more consecutive CCEs. A CCE is a unit of 9 REGs. Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$. The PDCCH supports multiple formats as listed in [Table 3]. A PDCCH composed of n successive CCEs start from a CCE satisfying i mod n=0 (i is the index of a CCE). A plurality of PDCCHs may be transmitted in one subframe.

TABLE 3

| PDCCH Format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to [Table 3], the eNB may determine a PDCCH format according to the number of areas in which control information will be transmitted. A UE may reduce overhead by reading control information in CCEs. Likewise, a relay may read control information in Relay-CCEs (R-CCEs). In an LTE-A system, REs may be mapped in units of R-CCEs to transmit an R-PDCCH to a relay.

Figure 12B:
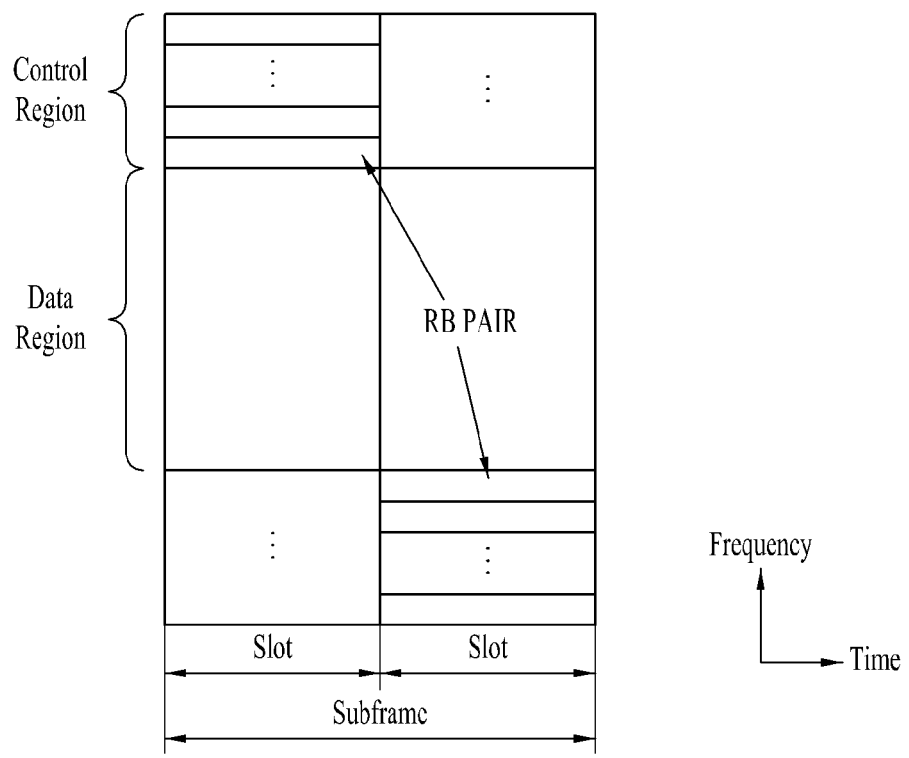
FIG. 12b illustrates the structure of an uplink subframe in a 3GPP LTE system.

FIG. 12b, an uplink subframe may be divided into a control region and a data region in the frequency domain. A PUCCH carrying Uplink Control Information (UCI) is allocated to the control region and a Physical Uplink Shared Channel (PUSCH) carrying user data is allocated to the data region. To maintain a single carrier property, a UE does not transmit a PUCCH and a PUSCH simultaneously. A PUCCH for one UE is allocated to an RB pair in a subframe. The RBs of the RB pair occupy different subcarriers in the two slots of the subframe. Thus, the RB pair allocated to the PUCCH frequency-hops over a slot boundary.

Figure 13:
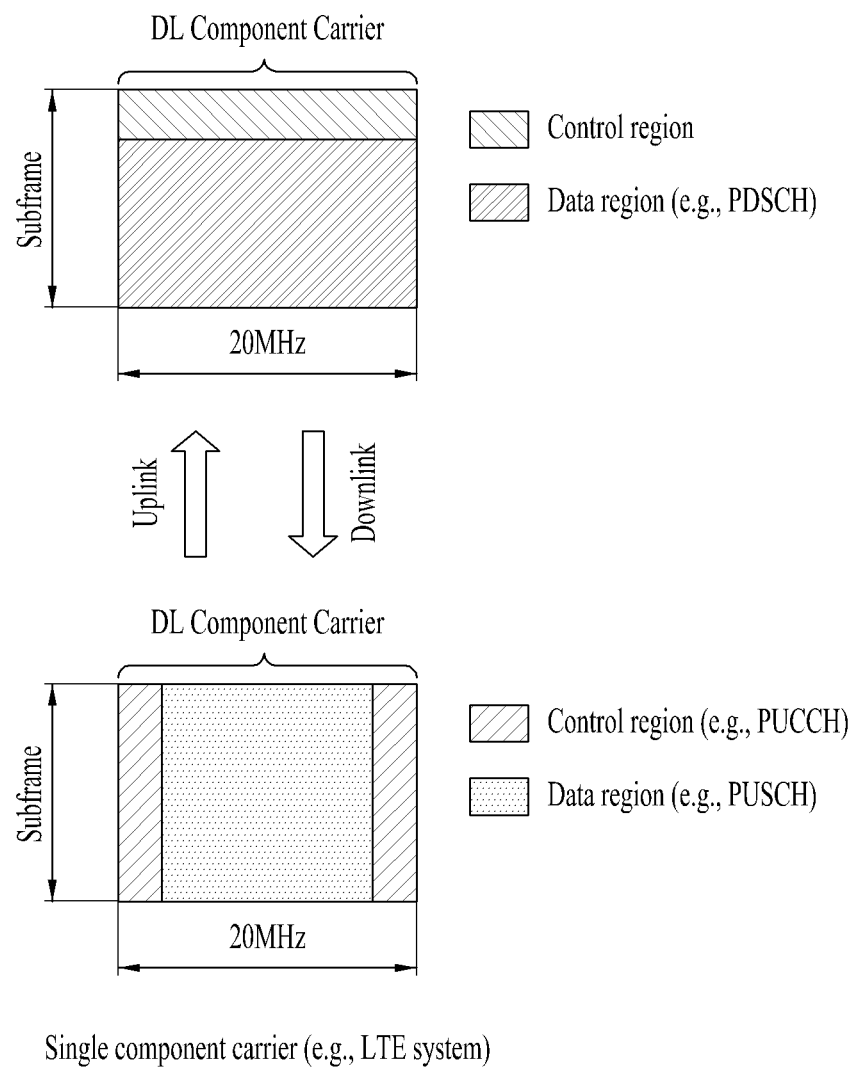
FIG. 13 illustrates an exemplary communication in a single carrier situation.

FIG. 13 illustrates an exemplary communication in a single carrier situation. In the LTE system, communication may be conducted in the single carrier situation.

Referring to FIG. 13, data is transmitted and received in a single downlink band and a single uplink band corresponding to the downlink band in a general Frequency Division Duplexing (FDD) wireless communication system. A BS and a UE transmit and receive data and/or control information that has been scheduled on a subframe basis. Data is transmitted in the data region of an uplink/downlink subframe and control information is transmitted in the control region of an uplink/downlink subframe. For this purpose, the uplink/downlink subframe delivers signals on various physical channels. While the single carrier situation has been described in the context of FDD, the same thing applies to Time Division Duplexing (TDD) by dividing a radio frame into an uplink and a downlink in the time domain.

Figure 14:
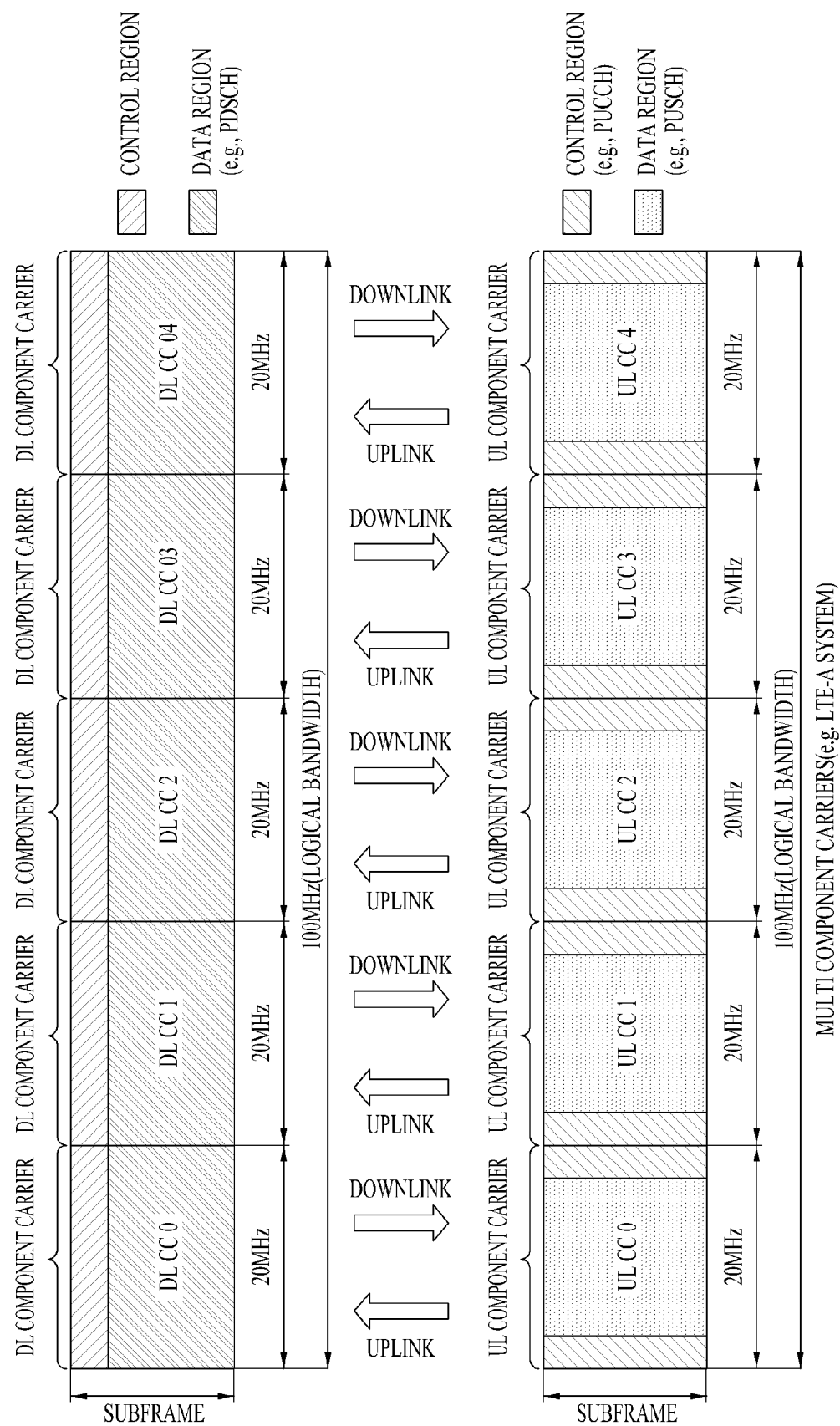
FIG. 14 illustrates an exemplary communication in a multi-carrier situation.

FIG. 14 illustrates an exemplary communication in a multi-carrier situation.

The LTE-A adopts Carrier Aggregation (CA) or bandwidth aggregation to use a wide frequency band, in which a plurality of uplink/downlink frequency blocks are aggregated into a broader uplink/downlink bandwidth. A multi-carrier system or a CA system refers to a system that aggregates a plurality of carriers each having a narrower band than a target bandwidth in order to support a broadband. To guarantee backward compatibility with a legacy system, each of the aggregated carriers, which has a smaller bandwidth than a target bandwidth, may be limited to a bandwidth used in the legacy system. For example, the legacy LTE system supports bandwidths of 1.4, 3, 5, 10, 15, and 20 MHz and the LTE-A system evolved from the LTE system may support a broader bandwidth than 20 MHz using these LTE bandwidths. Or CA may be supported by defining a new bandwidth irrespective of the bandwidths used in the legacy system. The term multi-carrier is used interchangeably with CA and a bandwidth set. In addition, CA covers both contiguous CA and non-contiguous CA.

For example, referring to FIG. 14, 100 MHz may be supported by aggregating 3 20-MHz Carrier Components (CCs) for an uplink/downlink. The CCs may be contiguous or non-contiguous in the frequency domain. While the bandwidth of a UL CC is equal to the bandwidth of a DL CC and UL CCs are symmetrical to DL CCs in FIG. 14, the bandwidth of each CC may be set independently. For example, the bandwidths of UL CCs may be configured to be 5 MHz (UL CC0)+20 MHz (UL CC1)+20 MHz (UL CC2)+20 MHz (UL CC3)+5 MHz (UL CC4). Asymmetrical CA is also possible, in which the number of UL CCs is different from the number of DL CCs. Asymmetrical CA may take place due to a limited available frequency band or may be configured artificially by a network setting. For example, even though a BS manages X DL CCs, the reception frequency band of a specific UE may be limited to Y (≤X) DL CCs. In this case, the UE has only to monitor a DL signal/data in the Y CCs. In addition, even though the BS manages L UL CCs, the transmission frequency band of the specific UE may be limited to M (≤L) UL CCs. The DL CCs or the UL CCs to which the specific UE is limited are referred to as serving UL CCs or DL CCs configured for the specific UE. The BS may allocate a predetermined number of CCs to the UE by activating all or part of CCs managed by the BS or deactivating part of the managed CCs. The BS may change the activated/deactivated CCs and the number of the activated/deactivated CCs. The BS may configure, as main DL CCs, Z DL CCs (1≤Z≤y≤X) that the UE should monitor/receive first of all, cell-specifically or UE-specifically. The BS may also configure, as main UL CCs, N UL CCs (1≤N≤M≤L) that the UE should transmit first of all, cell-specifically or UE-specifically. These main DL CCs or main UL CCs to which the UE is limited are referred to as serving UL CCs or DL CCs configured for the specific UE. Various parameters related to CA may be set cell-specifically, UE group-specifically, or UE-specifically.

Once the BS allocates available CCs to the UE cell-specifically or UE-specifically, at least one of the allocated CCs is not deactivated unless the CC allocation of the UE is reconfigured wholly or the UE performs handover. Hereinbelow, a CC that is not deactivated unless CC allocation of a UE is reconfigured wholly is called a Primary CC (PCC) and a CC that the BS can activate/deactivate freely is called a Secondary CC (SCC). For single-carrier communication, one PCC is used for communication between a UE and a BS, without any SCC. A PCC and an SCC may be identified by control information. For example, specific control information may be configured to be transmitted and received only on a specific CC. This specific CC may be referred to as a PCC, whereas the other CC(s) may be referred to as an SCC(s). For example, the specific control information may be control information transmitted on a PUCCH. If a UE can transmit control information of a PUCCH only on a PCC, the UL CC may be referred to as a UL PCC and the other UL CC(s) may be referred to as a UL SCC(s). In another example, if a UE-specific CC is used, a specific UE may receive a DL Synchronization Signal (SS) as specific control information from a BS. In this case, the DL CC on which the specific UE receives the DL CC for initial DL time synchronization (i.e. a DL CC used to attempt network entry to the BS) may be referred to as a DL PCC and the other DL CC(s) may be referred to as a DL SCC(s). In a communication system conforming to LTE-A release-10, one PCC per UE and 0 or one or more SCCs per UE are used for communication in the case of multi-carrier communication. This is a definition based on the LTE-A standard and a plurality of PCCs may be used per UE in the future. The PCC may be referred to as an anchor CC or a primary carrier and the SCC may be referred to as a secondary carrier.

The LTE-A system adopts the concept of cell to manage radio resources. A cell is defined by combining DL and UL resources, although the UL resources are not a necessity. However, this is a definition based on the current LTE-A standard and a cell may be configured only with UL resources. Accordingly, a cell may be configured with DL resources alone or both DL and UL resources. If CA is supported, the linkage between the carrier frequencies of DL resources (or DL CCs) and the carrier frequencies of UL resources (or UL CCs) may be indicated by system information. For example, the linkage between DL resources and UL resources may be indicated by System Information Block type 2 (SIB2). Herein, a carrier frequency refers to the center frequency of a cell or CC. A cell operating in a primary frequency (or PCC) may be referred to as a Primacy Cell (PCell) and a cell operating in a secondary frequency (SCC) may be referred to as a Secondary Cell (SCell). The UE uses the PCell for initial connection establishment or connection reestablishment. The PCell may be a cell indicated as a PCell during handover. An SCell may be configured after RRC connection establishment and may be used to provide additional radio resources. A PCell and an SCell may be collectively called serving cells. If the UE is in RRC_CONNECTED state but CA has not been configured or is not supported in the UE, only one serving cell being a PCell exists for the UE. On the other hand, if the UE is in RRC_CONNECTED state and CA has been configured for the UE, one or more serving cells may exist for the UE. The total serving cells may include a PCell and one or more SCells. However, serving cells may be allowed to include a plurality of PCells in the future. For CA, after an initial security activation procedure starts, a network may configure one or more SCells by adding them to a PCell initially configured during connection establishment. However, even though the UE supports CA, the network may configure only a PCell for the UE without adding an SCell. The PCell may be referred to as an anchor cell or a primary carrier and the SCell may be referred to as a secondary carrier.

In a multi-carrier system, a BS may transmit a plurality of data units to a UE on a given cell(s) (or CC(s)) and the UE may transmit ACKs/NACKs for the plurality of data units in a subframe. One or more cells (or DL CCs) may be allocated to the UE so that the UE may receive a PDSCH carrying downlink data in the cells (or DL CCs). The cells (or DL CCs) may be configured or reconfigured for the UE semi-statically by Radio Resource Control (RRC) signaling. The cells (or DL CCs) may be activated/deactivated for the UE dynamically by L1/L2 (MAC) control signaling. Accordingly, the maximum number of ACK/NACK bits to be transmitted from the UE is changed according to cells (or DL CCs) available to the UE. That is, the maximum number of ACK/NACK bits that the UE will transmit is set/reset by RRC signaling or changed according to a DL CC(s) activated (or a serving cell (s) configured) by L1/L2 signaling.

Figure 15:
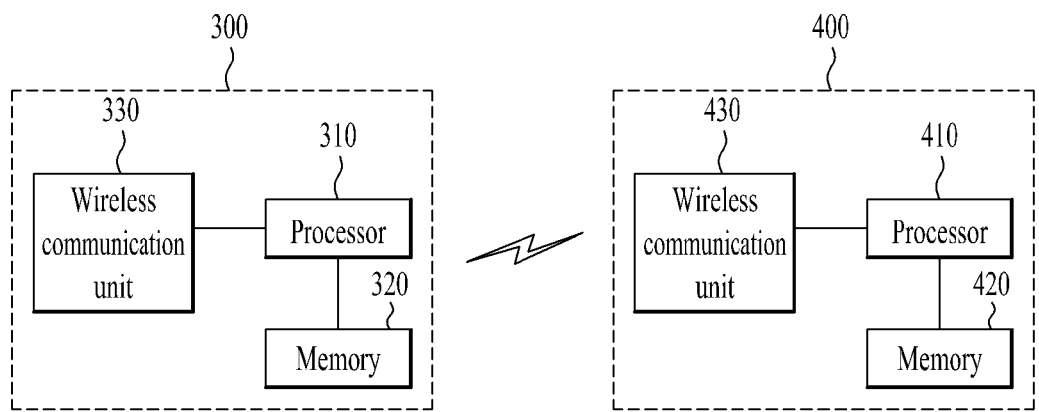
FIG. 15 is a block diagram of an LTE system according to an embodiment of the present invention.

FIG. 15 is a block diagram of an LTE system according to an embodiment of the present invention.

Referring to FIG. 15, the LTE system includes an LTE UE 300 and an LTE eNB 400.

A transmitter may be the eNB 400 and a receiver may be the UE 300 on a downlink, whereas a transmitter may be the UE 300 and a receiver may be the eNB 400 on an uplink.

The UE 300 may include a processor 310, a memory 320, and a wireless communication unit 330.

The processor 310 may be configured to implement the proposed procedures and/or the methods of the present invention.

The memory 320 is connected to the processor 310 and stores various types of information required to operate the processor 310.

The wireless communication unit 330 is connected to the processor 310 and transmits and/or receives a wireless signal.

The eNB 400 may include a processor 410, a memory 420, and a wireless communication unit 430.

The processor 410 may be configured to implement the proposed procedures and/or the methods of the present invention.

The memory 420 is connected to the processor 410 and stores various types of information required to operate the processor 410.

The wireless communication unit 430 is connected to the processor 410 and transmits and/or receives a wireless signal.

The UE 300 and/or the eNB 400 may include a single antenna and/or multiple antennas. If at least one of the UE 300 and the eNB 400 has multiple antennas, the wireless communication system may be regarded as a Multiple Input Multiple Output (MIMO) system.

A description will be given below of specific embodiments in which an LTE UE conducts data communication exclusively using TVWS by means of an RTS message and a CTS message in a heterogeneous network environment where the WLAN system and the LTE system according to the embodiments of the present invention coexist.

Figure 16:
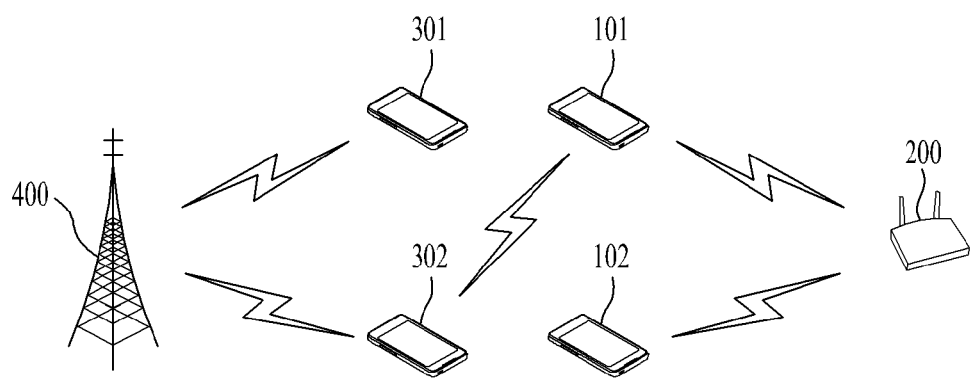
FIG. 16 illustrates a wireless communication system in a heterogeneous network environment according to an embodiment of the present invention.

FIG. 16 illustrates a wireless communication system in a heterogeneous network environment according to an embodiment of the present invention.

Referring to FIG. 16, the wireless communication system in a heterogeneous network environment includes the one or more WLAN STAs 101 and 102, the WLAN AP 200, one or more LTE UEs 301 and 302, and the LTE eNB 400.

The STAs 101 and 102 and the LTE UEs 301 and 302 are fixed or mobile and may be referred to as UEs, User Terminals (UTs), Subscriber Stations (SSs), wireless devices, Advanced Mobile Stations (AMSs), etc.

The STAs 101 and 102 and the LTE UEs 301 and 302 may be various electronic devices such as mobile terminals, telematics terminals, smart phones, portable terminals, PDAs, PMPs, laptop computers, tablet PCs, Wibro devices, IPTVs, TVs, 3D TVs, video players, navigators, AVN devices, etc.

The AP 200 is a fixed station communicating with the STAs 101 and 103 and may be referred to as a Node B, BTSs, etc.

The eNB 400 is a fixed station that controls communication of the LTE UEs 301 and 302.

Embodiment 1

In an embodiment of the present invention, a data transmission entity which is the LTE UE 300 or the eNB 400 transmits an RTS message and a CTS message to the STA 100 so as to exclusively use an arbitrary channel.

Figure 17:
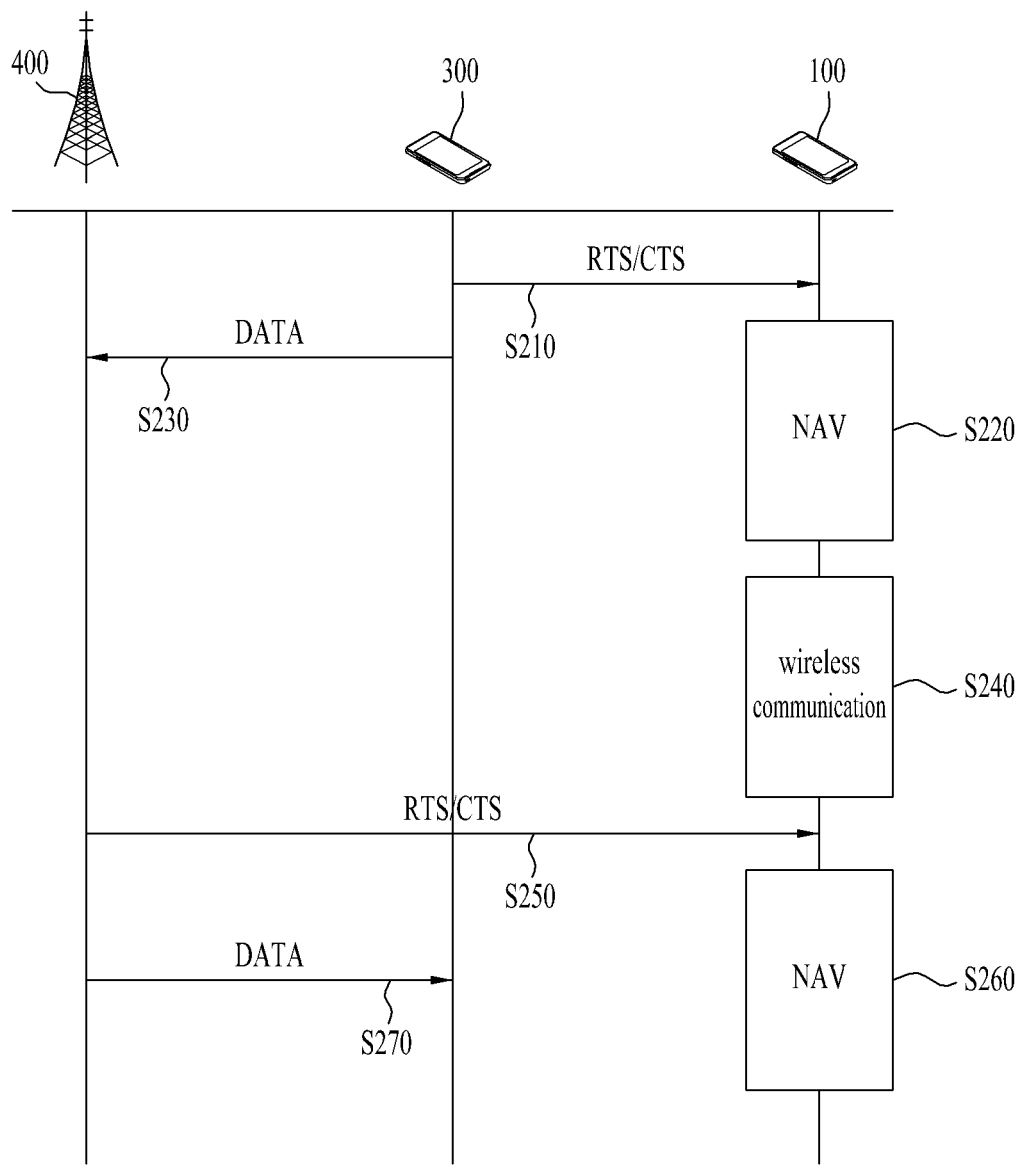
FIG. 17 is a diagram illustrating a signal flow for a network communication method using an RTS message and a CTS message in a heterogeneous network environment according to an embodiment of the present invention.

FIG. 17 is a diagram illustrating a signal flow for a network communication method using an RTS message and a CTS message in a heterogeneous network environment according to an embodiment of the present invention.

Referring to FIG. 17, the LTE UE 300 transmits virtual RTS and CTS messages to the STA 100 (S210).

The LTE UE 300 may transmit the virtual RTS and CTS messages on the arbitrary channel to the STA 100 that operates in a heterogeneous system, in order to use the arbitrary channel. The RTS and CTS messages may be transmitted to the STA 100 so that the LTE UE 300 may transmit data to the eNB 400.

The arbitrary channel may have a frequency band of TVWS.

The RTS and CTS messages are virtual RTS and CTS messages used for the LTE UE 300 to appear like a WLAN STA to exclusively use the arbitrary channel, rather than they request transmission or notify transmission availability.

The RTS and CTS messages may include a NAV value indicating a time during which the LTE UE 300 will use the arbitrary channel.

The LTE UE 300 may transmit the RTS and CTS messages to the AP 200, instead of the STA 100.

Or the LTE UE 300 may transmit the RTS message to the AP 200 and receive the CTS message from the AP 200. As described before, the AP 200 may transmit the CTS message to the STA 100 within the service coverage of the AP 200, for contention-based resource allocation.

If a plurality of LTE UEs transmit RTS and CTS messages to the STA 100, the eNB 400 may prioritize the plurality of LTE UEs or switch data transmission and reception of an LTE UE selected from the plurality of LTE UEs to a standby mode by an algorithm.

Upon receipt of the RTS and CTS messages from the LTE UE 300, the eNB 400 may not decode the received messages. That is, the eNB 400 may not decode the RTS and CTS messages which may be interference signals during data transmission and reception. For this purpose, the eNB 400 may use a data format or algorithm that identifies the RTS and CTS messages and may reach an agreement for the message identification with the LTE UE 300 in advance.

Upon receipt of the RTS and CTS messages, the STA 100 discontinues communication during a time indicated by the NAV value included in the RTS and CTS messages (S220).

The STA 100 may discontinue communication by setting data communication on the arbitrary channel to a standby mode.

Then the LTE UE 300 conducts data communication with the eNB 400 (S230).

If the STA 100 discontinues the data communication on the arbitrary channel and thus the LTE UE 300 can use the arbitrary channel exclusively, the LTE UE 300 conducts data communication with the eNB 400 on the arbitrary channel for the time indicated by the NAV value.

The data may be upload data that the LTE UE 300 wants to transmit to the eNB 400.

When the data transmission and reception is completed between the LTE UE 300 and the eNB 400, the STA 100 conducts data communication with the AP 200 on the arbitrary channel (S240).

When the time indicated by the NAV value elapses, the STA 100 may conduct data communication with the AP 200 on the arbitrary channel. The STA 100 may conduct data communication with the AP 200 using the arbitrary channel in a contention-based manner by exchanging RTS and CTS messages with the AP 200.

In the embodiment of the present invention, the eNB 400 may transmit virtual RTS and CTS messages to the STA 100 (S250).

The eNB 400 may transmit the virtual RTS and CTS messages on the arbitrary channel to the STA 100 that operates in a heterogeneous system, in order to use the arbitrary channel. The RTS and CTS messages may be transmitted to the STA 100 so that the eNB 400 may transmit data to the LTE UE 300.

The arbitrary channel may have a frequency band of TVWS.

The RTS and CTS messages may include a NAV value indicating a time during which the eNB 400 will use the arbitrary channel.

The eNB 400 may transmit the RTS and CTS messages to the AP 200, instead of the STA 100. As described before, the AP 200 may transmit the CTS message to the STA 100 within the service coverage of the AP 200, for contention-based resource allocation.

Upon receipt of the RTS and CTS messages from the eNB 400, the LTE UE 300 may not decode the received messages. That is, the LTE UE 300 may not decode the RTS and CTS messages which may be interference signals during data transmission and reception. For this purpose, the LTE UE 300 may use a data format or algorithm that identifies the RTS and CTS messages and may reach an agreement for the message identification with the eNB 400 in advance.

Upon receipt of the RTS and CTS messages, the STA 100 discontinues communication during a time indicated by the NAV value included in the RTS and CTS messages (S260).

The STA 100 may discontinue communication by setting data communication on the arbitrary channel to a standby mode.

Then the eNB 400 conducts data communication with the LTE UE 300 (S270).

If the STA 100 discontinues the data communication on the arbitrary channel and thus the eNB 400 can use the arbitrary channel exclusively, the eNB 400 conducts data communication with the LTE UE 300 on the arbitrary channel for the time indicated by the NAV value.

The data may be download data that the eNB 400 wants to transmit to the LTE UE 300.

Embodiment 2

In another embodiment of the present invention, the eNB 400 transmits an RTS message and a CTS message to the STA 100 so as to transmit data to or receive data from the LTE UE 300 exclusively using an arbitrary channel.

FIG. 18 is a diagram illustrating a signal flow for a network communication method using an RTS message and a CTS message in a heterogeneous network environment according to another embodiment of the present invention.

Referring to FIG. 18, the eNB 400 transmits virtual RTS and CTS messages to the STA 100 (S310).

The eNB 400 may transmit the virtual RTS and CTS messages on the arbitrary channel to the STA 100 that operates in a heterogeneous system, in order to use the arbitrary channel. The RTS and CTS messages may be transmitted to the STA 100 so that the eNB 400 may receive data from LTE UE 300.

The arbitrary channel may have a frequency band of TVWS.

The RTS and CTS messages may include a NAV value indicating a time during which the eNB 400 will use the arbitrary channel.

The eNB 400 may transmit the RTS and CTS messages to the AP 200, instead of the STA 100.

Or the eNB 400 may transmit the RTS message to the AP 200 and receive the CTS message from the AP 200. As described before, the AP 200 may transmit the CTS message to the STA 100 within the service coverage of the AP 200, for contention-based resource allocation.

If a plurality of LTE UEs transmit RTS and CTS messages to the STA 100, the eNB 400 may prioritize the plurality of LTE UEs or switch data transmission and reception of an LTE UE selected from the plurality of LTE UEs to a standby mode by an algorithm.

Upon receipt of the RTS and CTS messages, the STA 100 discontinues communication during a time indicated by the NAV value included in the RTS and CTS messages (S320).

The STA 100 may discontinue communication by setting data communication on the arbitrary channel to a standby mode.

Then the eNB 400 conducts data communication with the LTE UE 300 (S330).

If the STA 100 discontinues the data communication on the arbitrary channel and thus the arbitrary channel can be used exclusively, the LTE UE 300 conducts data communication with the eNB 400 on the arbitrary channel for the time indicated by the NAV value.

The data may be upload data that the eNB 400 wants to receive from the LTE UE 300.

When the data transmission and reception is completed between the LTE UE 300 and the eNB 400, the STA 100 conducts data communication with the AP 200 on the arbitrary channel (S340).

When the time indicated by the NAV value elapses, the STA 100 may conduct data communication with the AP 200 on the arbitrary channel. The STA 100 may conduct data communication with the AP 200 using the arbitrary channel in a contention-based manner by exchanging RTS and CTS messages with the AP 200.

Further, the eNB 400 may transmit virtual RTS and CTS messages to the STA 100 (S350).

The eNB 400 may transmit the virtual RTS and CTS messages on the arbitrary channel to the STA 100 that operates in a heterogeneous system, in order to use the arbitrary channel. The RTS and CTS messages may be transmitted to the STA 100 so that the eNB 400 may transmit data to the LTE UE 300.

The RTS and CTS messages may include a NAV value indicating a time during which the eNB 400 will use the arbitrary channel.

Upon receipt of the RTS and CTS messages, the STA 100 discontinues communication during a time indicated by the NAV value included in the RTS and CTS messages (S360).

The STA 100 may discontinue communication by setting data communication on the arbitrary channel to a standby mode.

Then the eNB 400 conducts data communication with the LTE UE 300 (S370).

If the STA 100 discontinues the data communication on the arbitrary channel and thus the eNB 400 can use the arbitrary channel exclusively, the eNB 400 conducts data communication with the LTE UE 300 on the arbitrary channel for the time indicated by the NAV value.

The data may be download data that the eNB 400 wants to transmit to the LTE UE 300.

While it has been described that a heterogeneous network includes MSs and BSs of a WLAN system and an LTE system in the foregoing embodiments of the present invention, it is to be understood that the embodiments are also applicable to any heterogeneous network including MSs and BSs of different systems.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A communication method in a heterogeneous network environment in which a long term evolution (LTE) system and a wireless local area network (WLAN) system coexist and use a same frequency band, the communication method comprising:

transmitting a message by an LTE-based device to a WLAN-based device when the LTE-based device has data to be transmitted to an LTE-based base station via a channel in the frequency band used by the LTE system and the WLAN system, wherein the message includes information of a network allocation vector (NAV) value indicating a time duration for which the channel is to be used by the LTE-based device to transmit the data to the LTE-based base station; and transmitting the data by the LTE-based device to the LTE-based base station via the channel during the time duration indicated by the NAV value, wherein the WLAN-based device discontinues using the channel during the time duration indicated by the NAV value.

2. The communication method according to claim 1, wherein the WLAN-based device uses an 802.11 system.

3. The communication method according to claim 2, wherein the message is a Request to Send (RTS) message and a Clear to Send (CTS) message used in the 802.11 system.

4. The communication method according to claim 1, wherein the LTE-based base station does not decode the message when the LTE-based base station receives the message.

5. The communication method according to claim 1, wherein the channel is a channel of Television White Space (TVWS).

6. The communication method according to claim 1, wherein resources are allocated based on scheduling between the LTE-based device and the LTE-based base station.

7. A long term evolution (LTE)-based mobile communication terminal in a heterogeneous network environment in which an LTE system and a wireless local area network (WLAN) system coexist and use a same frequency band, the mobile communication terminal comprising:
a wireless communication unit configured to transmit and receive a signal; and
a processor configured to:
control the wireless communication unit to transmit a message to a WLAN-based device when the mobile communication terminal has data to be transmitted to an LTE-based base station via a channel in the frequency band used by the LTE system and the WLAN system,
wherein the message includes information of a network allocation vector (NAV) value indicating a time duration for which the channel is to be used by the LTE-based mobile communication terminal to transmit the data to the LTE-based base station, and
control the wireless communication unit to transmit the data to the LTE-based base station via the channel during the time duration indicated by the NAV value,
wherein the WLAN-based device discontinues using the channel during the time duration indicated by the NAV value.

8. The LTE-based mobile communication terminal according to claim 7, wherein the WLAN-based device uses an 802.11 system.

9. The LTE-based mobile communication terminal according to claim 8, wherein the message is a Request to Send (RTS) message and a Clear to Send (CTS) message used in the 802.11 system.

10. The LTE-based mobile communication terminal according to claim 7, wherein the channel is a channel of Television White Space (TVWS).

11. The LTE-based mobile communication terminal according to claim 7, wherein resources are allocated based on scheduling between the LTE-based mobile communication terminal and the LTE-based base station.

* * * * *